(12) United States Patent
Quevallier

(10) Patent No.: US 11,808,199 B2
(45) Date of Patent: Nov. 7, 2023

(54) THERMOSTATIC VALVE AND VEHICLE COMPRISING SAID VALVE

(71) Applicant: NOVARES FRANCE, Clamart (FR)

(72) Inventor: Jean-Claude Quevallier, Lesquin (FR)

(73) Assignee: NOVARES FRANCE, Clamart (FR)

( * ) Notice: Subject to any disclaimer, the term of this patent is extended or adjusted under 35 U.S.C. 154(b) by 0 days.

(21) Appl. No.: 17/282,837

(22) PCT Filed: Sep. 26, 2019

(86) PCT No.: PCT/FR2019/052287
§ 371 (c)(1),
(2) Date: Apr. 5, 2021

(87) PCT Pub. No.: WO2020/070414
PCT Pub. Date: Apr. 9, 2020

(65) Prior Publication Data
US 2021/0388753 A1 Dec. 16, 2021

(30) Foreign Application Priority Data
Oct. 5, 2018 (FR) ..................... 18/59250

(51) Int. Cl.
*F01P 7/16* (2006.01)
(52) U.S. Cl.
CPC ............. *F01P 7/16* (2013.01); *F01P 2050/22* (2013.01); *F01P 2070/04* (2013.01)
(58) Field of Classification Search
CPC .......... F01P 7/16; F01P 2070/04; F01P 7/026; F16K 31/002; F16K 11/044; F16K 31/025
See application file for complete search history.

(56) References Cited

U.S. PATENT DOCUMENTS 4,753,271 A * 6/1988 Fornasari ................ F25B 41/26
251/335.3
4,875,437 A * 10/1989 Cook ................. G05D 23/1921
123/41.1
(Continued)

FOREIGN PATENT DOCUMENTS

CN 102077004 A 5/2011
CN 102906477 A 1/2013
(Continued)

OTHER PUBLICATIONS

International Search Report dated Jan. 17, 2020 re: Application No. PCT/FR2019/052287, pp. 1-2, citing: U.S. Pat. No. 14875437 A, EP 0235472 A1 and EP 1132590 A1.
(Continued)

*Primary Examiner* — Long T Tran
(74) *Attorney, Agent, or Firm* — CANTOR COLBURN LLP

(57) ABSTRACT

A thermostatic valve includes a housing having a fluid inlet, a first outlet and a second outlet, a flap that is movable between a closed position, in which the flap closes the first outlet, and an open position, in which the flap opens the first outlet. The valve also includes a thermostatic actuator with an actuating rod connected to the flap and a capsule containing a thermally expanding material, and a heating element. The capsule has an internal portion, which extends inside the housing so as to be immersed in the fluid flowing between the inlet and the second outlet of the housing, and an external portion, which extends outside the housing. The heating element is arranged outside the housing and outside the capsule in order to heat the external portion.

10 Claims, 5 Drawing Sheets

(56) References Cited

U.S. PATENT DOCUMENTS

| | | | | |
|---|---|---|---|---|
| 4,890,790 | A * | 1/1990 | Wagner | G05D 23/1921 236/34.5 |
| 4,961,530 | A * | 10/1990 | Wagner | F01P 7/167 236/100 |
| 5,183,012 | A * | 2/1993 | Saur | F01P 7/167 236/101 B |
| 5,676,308 | A * | 10/1997 | Saur | G05D 23/1921 236/34.5 |
| 6,032,869 | A * | 3/2000 | Ito | B60H 1/00314 237/12.3 B |
| 6,460,492 | B1 * | 10/2002 | Black | F01P 7/16 123/41.1 |
| 2001/0019081 | A1 * | 9/2001 | Mabboux | F01P 7/167 236/34.5 |
| 2002/0104892 | A1 * | 8/2002 | Suda | F01P 7/167 236/101 C |
| 2003/0183701 | A1 * | 10/2003 | Takahashi | F01P 7/16 236/34.5 |
| 2004/0238652 | A1 * | 12/2004 | Takei | G05D 23/1921 236/34.5 |
| 2008/0290085 | A1 | 11/2008 | Schlipf | |
| 2010/0230399 | A1 | 9/2010 | Pottie et al. | |
| 2015/0351157 | A1 | 12/2015 | Cho et al. | |
| 2017/0308105 | A1 * | 10/2017 | Roman | F01P 7/16 |

FOREIGN PATENT DOCUMENTS

| | | |
|---|---|---|
| CN | 108278151 A | 7/2018 |
| DE | 10144844 A1 | 4/2003 |
| DE | 10207036 A1 | 7/2003 |
| DE | 10360169 A1 | 7/2005 |
| DE | 102009056041 A1 | 6/2011 |
| EP | 0235472 A1 | 9/1987 |
| EP | 1132590 A1 | 9/2001 |
| EP | 2630351 A1 | 8/2013 |
| GB | 2253264 A | 9/1992 |
| JP | 2003328753 A | 11/2003 |
| RU | 2270923 C2 | 2/2006 |
| WO | 2012053995 A1 | 4/2012 |

OTHER PUBLICATIONS

Chinese Office Action dated Dec. 7, 2021, issued in CN Application No. 201980080073.7, 10 pages, Non-English.

* cited by examiner

THERMOSTATIC VALVE AND VEHICLE COMPRISING SAID VALVE

TECHNICAL FIELD

The present disclosure concerns a thermostatic valve intended to control a fluid flow rate, in particular the coolant flow rate for a vehicle engine, and a vehicle equipped with this valve.

BACKGROUND

It is known to regulate the temperature of a vehicle engine using a water outlet case or a water inlet collector equipped with a thermostatic valve. The thermostatic valve controls the coolant flow rate of the engine towards a radiator.

The thermostatic valves traditionally comprise a case having a fluid inlet, a first fluid outlet connected to the radiator, a second fluid outlet connected to a secondary circuit known as «bypass» circuit, a flap intended to close the first fluid outlet, and a thermostatic actuator, conventionally a wax capsule provided with an actuating rod making it possible to displace the flap in order to open a passage to the radiator. The change of state of the wax from a solid state to a liquid state, which causes an increase in volume displacing the flap, depends on the temperature of the fluid circulating in the case. Beyond a predetermined opening temperature, conventionally comprised between 80° C. and 90° C., the wax changes the state, causing the opening of the flap.

In order to optimize the efficiency of modern engines and meet the requirements of the new pollutant and $CO_2$ emissions standards, the thermal regulation of the engines is advantageously postponed between 100° C. and 110° C. in light use (low and medium load). Nonetheless, for certain cases of use (heavy load and/or high speed), it is necessary to lower the temperature of the coolant in order to avoid detrimental overheating of the engine.

To obviate this risk, it is known to equip the thermostatic valve with a heating element extending inside the capsule in order to heat the wax and anticipate the opening of the flap. The heating element is generally in the form of an electrical resistance which directly heats the wax. This electrical resistance can be integrated into the actuating rod of the thermostatic actuator. A thermostatic valve equipped with this heating element conventionally offers two operating modes: a non-controlled operating mode, in which the opening of the flap is controlled only by the temperature of the circulating fluid in which the wax capsule is bathed, and a controlled operating mode, in which the heating element provides energy which is added to the energy of the circulating fluid, so that the opening temperature of the flap is anticipated by about 20° C. compared to the opening temperature in a non-controlled operation. Thus, under conditions of high engine stress for example, the electric control of the thermostatic flap makes it possible to anticipate the opening of the circulation to the radiator, improving the evacuation of heat.

The heating element is conventionally made of an electric resistance contained in a metal rod which acts as a thermostat rod. This type of heating element is thus known from documents US20080290085, US20100230399 and US20150351157.

An electrically controlled thermostat is known from document EP2630351 which shows a heating element of the PTC type (standing for «Positive Temperature Coefficient») immersed in the wax of the capsule.

Document DE102009056041 shows a PTC type element used as an active temperature probe to control the heating power of a heating resistance arranged in the wax capsule.

Another example of an electrically controlled thermostat is known from document RU2270923 which shows an expandable load capsule mounted outside the case and equipped with an electric heating resistance, with a view to displace a flap opening towards a radiator circuit. However, the capsule is isolated from the circulating fluid by the flap, so that this thermostat cannot operate in non-controlled mode, except to provide a temperature sensor upstream or a second thermostat bathed in the circulating fluid.

A drawback of electrically controlled thermostatic valves is the tightness of the electrical conductors connected to the heating element. There is a risk that the circulating fluid goes up through these electrical conductors to an engine computer, with the risk of causing a failure of the electronic equipment.

Another drawback lies in the fact that the heating elements integrated in the wax capsule require the use of a pure wax, devoid of conductive charges. Indeed, these conductive, metallic charges would risk to be agglomerated on the actuating rod integrating the heating element, for example via a micro-welding phenomenon, making the actuating rod abrasive for the dynamic seal ensuring the seal between the capsule and the circulating fluid.

Furthermore, electric control of the thermostatic valve and the opening of the flap may be required for purposes other than engine cooling, for example to regulate the temperature of an automatic gearbox or for temperature management linked to polluting discharges. In these particular cases, it may be necessary to open the flap while the fluid circulating in the case is still cold. The wax is then electrically heated by the heating element, but simultaneously cooled by the fluid in which the capsule of wax bathes. When the temperature of the fluid is below a predetermined threshold, the heating element is not able to open the flap on its own. However, applications such as the cooling of an automatic gearbox may require the opening of the flap when the temperature of the fluid is relatively low. There is therefore a need to be able to control a thermostatic valve at the lowest possible temperatures of the circulating fluid.

SUMMARY

The disclosure aims to overcome all or part of these drawbacks, by proposing an electrically controlled thermostatic valve and offering improved efficiency and tightness.

To this end, the present disclosure relates to a thermostatic valve comprising a case, the case comprising at least one fluid inlet, at least one first fluid outlet and at least one second fluid outlet, a main flap movable relative to the case between a closed position in which the main flap closes the first fluid outlet and an open position in which the main flap opens the first fluid outlet, a thermostatic actuator, the thermostatic actuator comprising an actuating rod connected to the main flap and a capsule containing a heat-expandable material, and a heating element for heating the heat-expandable material, characterized in that the capsule of the thermostatic actuator has an inner portion which extends inside the case so as to bathe in the fluid circulating between the inlet and the second outlet of the case, and an outer portion which extends outside the case, in that the heating element is arranged outside the case and outside the capsule to heat the outer portion of this capsule.

Thus, the thermostatic valve according to the disclosure offers tightness and improved efficiency. Indeed, the positioning of the heating element outside the case and the capsule, that is to say away from both the fluid and the heat-expandable material, prevents any risk of leakage. In addition, as the heating element no longer bathes in the heat-expandable material, the use of pure wax is no longer required, thus offering the possibility of modifying the properties of the wax in order to improve the efficiency of the thermostatic valve. Also, as the outer portion of the capsule is not in contact with the circulating fluid, the latter is less sensitive to the temperature of the fluid; when the fluid is relatively cold, it therefore becomes however possible to electrically control the valve according to the disclosure by virtue of the heating element acting on the outer portion of the capsule. Nonetheless, the fact that the capsule retains an inner portion submerged in the fluid flow still allows efficient use of the valve in a non-controlled operating mode.

According to a preferred embodiment, the heating element is a PTC element. The PTC elements (for «Positive Temperature Coefficient») have the advantage of offering self-regulation of the power as a function of temperature.

According to a preferred embodiment, the thermostatic valve comprises a thermally and electrically insulating protective cap, housing the heating element and the outer portion of the capsule. This cap thus ensures the thermal insulation of the heating element and of the outer portion of the capsule with respect to the ambient air.

The protective cap can be added and fixed to the case, in particular so as to press the heating element against the capsule. The valve may also comprise an electrical supply connector connected to the heating element, the electrical supply connector being remote or integrated into the protective cap. The cap ensures the sealing of the heating element and the electrical wiring connecting the heating element to the connector. This cap will therefore advantageously be made of plastic, for example of the Polyamide (PA) 6 or 6-6 type or of the Polyphthalamide (PPA) type, which has all the required properties, in particular for electrical insulation and having good heat resistance.

According to a preferred embodiment, the thermostatic valve comprises return means configured to hold the heating element in contact with the capsule. These return means make it possible to hold the capsule/PTC element stacking under pressure when the main flap is closed, in order to guarantee good thermal and electrical continuity.

According to a preferred embodiment, the heat-expandable material is a wax including a thermally conductive charge. Thus, the reactivity of the thermostatic valve is improved.

According to a preferred embodiment, the capsule is fixedly mounted relative to the case. This allows easier management of the seal. The thermostatic valve thus advantageously comprises static sealing means.

According to a preferred embodiment, the actuating rod is configured to extend into the outer portion of the capsule. Thus, it improves the sensitivity of the actuating rod to the change in wax volume in the outer portion of the capsule, that is to say in controlled operating mode.

According to a preferred embodiment, the thermostatic valve comprises means for returning the main flap to the closed position, mounted in opposition to the thermostatic actuator.

According to a preferred embodiment, the thermostatic valve comprises a secondary flap configured to shut off or open the second fluid outlet when the main flap is respectively open or closed.

According to another aspect, the disclosure concerns a motor vehicle comprising a thermostatic valve having the aforementioned characteristics.

BRIEF DESCRIPTION OF THE DRAWINGS

Other characteristics and advantages of the present disclosure will emerge clearly from the detailed description below of an embodiment, given by way of non-limiting example, with reference to the appended drawings in which.

DETAILED DESCRIPTION OF THE DRAWINGS

Figure 1A:
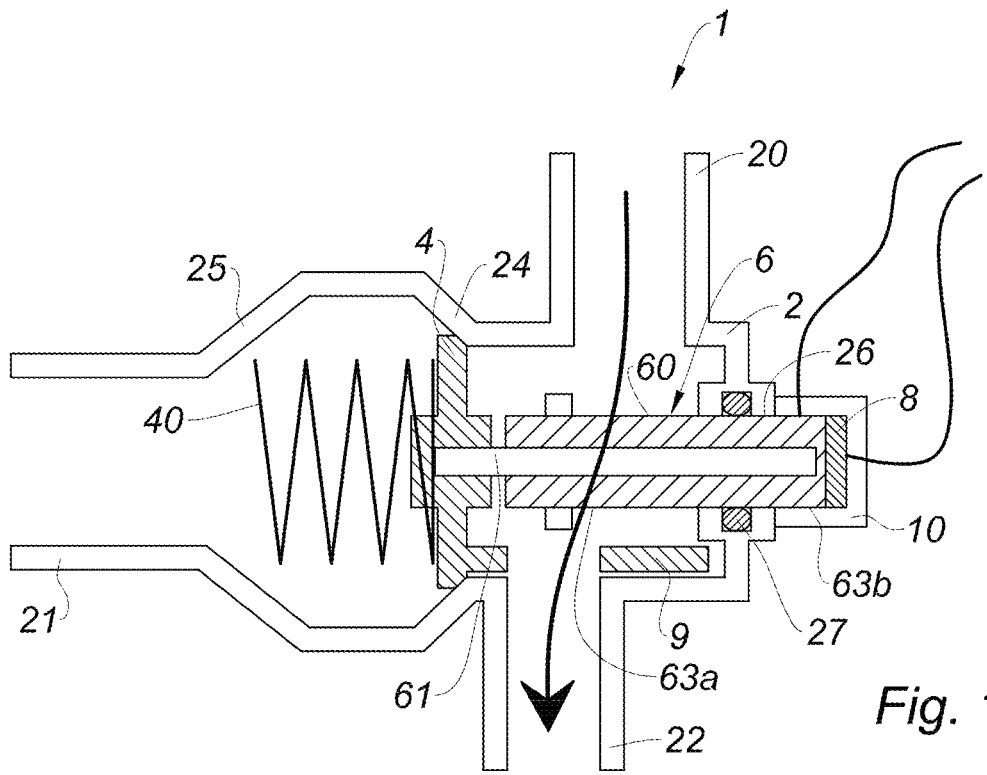
FIGS. 1A and 1B are schematic views of a valve according to an embodiment of the disclosure, the main flap respectively in the closed and open position.
Figure 1B:
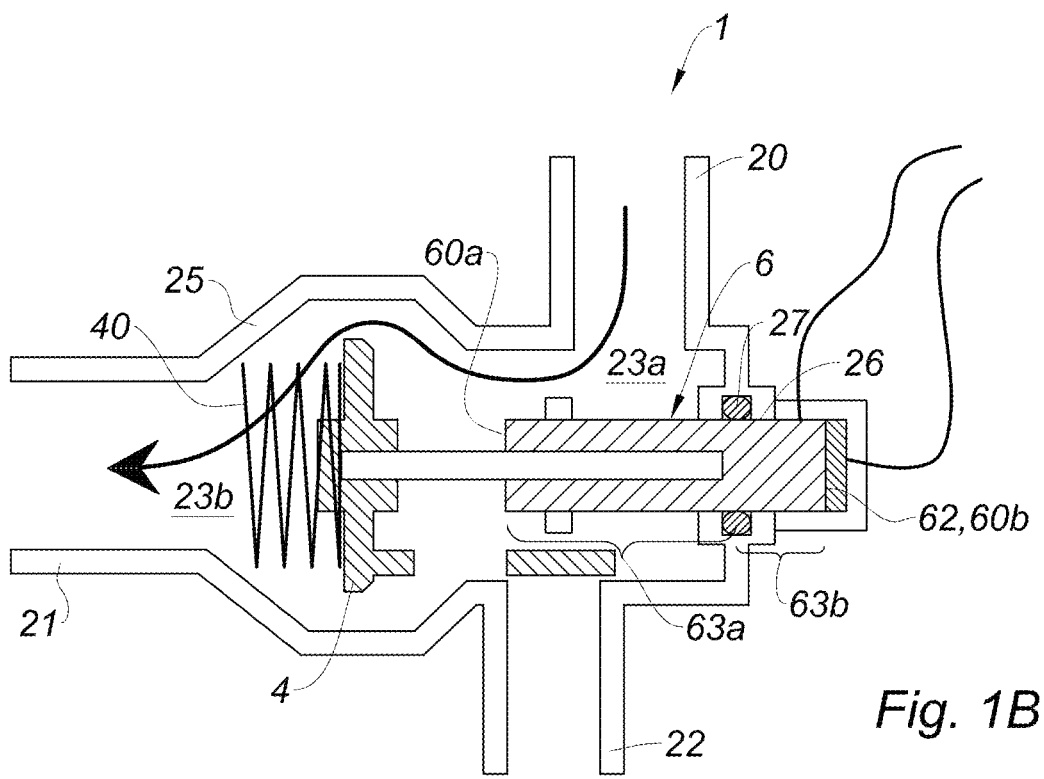

FIGS. 1A and 1B show a thermostatic valve 1 according to one embodiment of the disclosure. The thermostatic valve 1 is used to regulate the fluid flow rate, typically the coolant of a component, for example an engine, of a motor vehicle. Thus, the thermostatic valve 1 can equip a water outlet case or a water inlet case. It can be electrically controlled.

The thermostatic valve 1 comprises a case 2, a main flap 4, a thermostatic actuator 6 with a capsule 60 of heat-expandable material to open the main flap 4 as a function of the temperature of the fluid circulating in the case 2 (non-controlled operating mode of the thermostatic valve 1), and a heating element 8 to heat the heat-expandable material and consequently anticipate the opening of the main flap 4 (controlled operating mode of the thermostatic valve 1).

The case 2 comprises a fluid inlet 20 for receiving a coolant from the engine, a first fluid outlet 21 which is intended to be connected to a radiator and a second fluid outlet 22 which is intended to be connected to a secondary circuit also called «bypass» circuit. The interior of the case 2 is hollow and delimits an internal fluid circulation volume, into which the fluid inlet 20 as well as the first and second fluid outlets 21, 22 open out. As indicated in FIG. 1B, the main flap 4 divides the internal volume of fluid circulation into an upstream portion 23a and a downstream portion 23b.

The main flap 4, for example in the form of a disc, is intended to close or open the first fluid outlet 21 leading to the radiator. For this purpose, the flap 4 is movable relative to the case 2 between a closed position (FIGS. 1A, 2B, 3B) in which the main flap 4, bearing against a seat 24 of the case 2, prevents the fluid from circulating to the first outlet 21, and an open position (FIGS. 1B, 2C, 3C) in which the main flap 4, remote from the seat 24, allows fluid to flow from the inlet 20 to the first outlet 21. The main flap 4 is movable in translation between the open position and the closed position.

The main flap 4 is advantageously offset relative to the fluid inlet 20: it does not extend to the right thereof. In addition, to limit the impact of the pressure on the opening temperature, the main flap 4 preferably extends parallel to the normal to the fluid inlet opening 20, and not orthogonally thereto. It will also be noted that the displacement of the main flap 4 from the closed position to the open position takes place downstream, that is to say in the direction of flow of the fluid, and not in a direction contrary to the flow of fluid to the first outlet 21.

To return the main flap 4 to the closed position, the thermostatic valve 1 is equipped with return means, such as a spring 40. The spring 40 has one end bearing on a shoulder 25 of the case and another end bearing on the main flap 4. It will be noted that these return means are advantageously arranged opposite the thermostatic actuator 6 and in particular its capsule 60 of heat-expandable material, that is to say on the other side of the main flap 4, in the downstream portion 23b of the case 2.

The thermostatic actuator 6 comprises a capsule 60 of a heat-expandable material, for example a wax capsule, and an actuating rod 61 cooperating with the main flap 4 to displace the latter towards the open position when the volume of the heat-expandable material increases. The thermostatic actuator 6 is arranged perpendicular to the main flap 8, and substantially orthogonal to the inlet 20 and to the second outlet 22 of the fluid.

The actuating rod 61 is movable relative to the capsule 60 between a deployed position (FIGS. 1B, 2C, 3C), in which the actuating rod 61 maintains the main flap 4 in the open position, and a retracted position (FIGS. 1A, 2B, 3B) in which the actuating rod 61 allows the main flap 4 to be closed. The actuating rod 61 is movable in translation between its deployed and retracted positions. It is the increase in volume of the heat-expandable material which causes the displacement of the actuating rod 61 from the retracted position to the deployed position, in opposition to the return means. The reverse displacement of the actuating rod 61 is provided by the action of the return means of the main flap 4, when the material contained in the capsule decreases in volume.

The actuating rod 61 bears against the main flap 4, opposite the spring 40. As shown for example in FIGS. 2B and 3B, it advantageously has a first end 61a fitted with the main flap 4, for example housed in a sleeve 41 of the main flap 4. A second end 61b opposite to the first end 61a is located in the capsule 60.

The capsule 60 contains a heat-expandable material, such as wax, intended to increase in volume under the effect of temperature, and more particularly from a so-called «opening» threshold temperature of the fluid circulating in the case, for example in the range of 100° C. to 110° C. The capsule 60 can be cylindrical. It has a submerged end 60a and a non-submerged end 60b. The submerged end 60a delimits an opening through which the actuating rod 61 extends outside the capsule 60. The non-submerged end 60b has a bottom 62 which extends outside the case 2 and against which can be arranged a heating element 8, as will be described in more detail below. As the heating element 8 is outside the capsule 60, the wax contained in the capsule 60 can advantageously comprise a thermally conductive charge allowing to improve the reactivity of the wax. This charge, for example metallic, can be copper powder.

The capsule 60 is fixedly mounted with respect to the case 2. It also passes through the case 2. As a result, the case 2 has a mounting opening 26 through which the capsule 60 extends. Thus, the capsule 60 is divided into two portions: an inner portion 63a, which is inside the case 2, and an outer portion 63b, which is outside the case 2. The inner portion 63a is arranged to bathe in the fluid circulating inside the case 2; it extends precisely in the upstream portion 23a of the inner fluid circulation volume delimited by the case 2. The outer portion 63b, on the other hand, is outside the fluid circulation volume delimited by the case 2; it is bathed in the ambient air around the case 2. Sealing means, preferably static, such as an O-ring 27, can be placed in the mounting opening 26 in order to achieve the seal between the capsule 60 and the case 2. This seal marks the separation between the inner portion 63a and the outer portion 63b of the capsule 60.

It is necessary for the capsule 60 to bathe sufficiently in the fluid flow rate so that the thermostatic valve 1 can operate in non-controlled operating mode. For this purpose, the inner portion 63a extends over at least one third of the total length of the capsule 60, but it is preferably longer than the outer portion 63b. According to the advantageous embodiment illustrated in the figures, the length of the inner portion 63a is in the range of approximately two thirds to three quarters of the total length of the capsule 60.

In the retracted position, the actuating rod 61 extends inside the outer portion 63b, in order to improve the reactivity in controlled mode of the thermostatic actuator 6. Thus, in the retracted position, its second end 61b is located in the outer portion 63b.

The electric heating element 8 is intended to heat the heat-expandable material of the capsule 60. This heating element 8 is an electrical resistance, for example a coiled resistive element, or a thermistor, such as for example a PTC element. This PTC element can be obtained from ceramic powder and may be in the form of a tablet.

The heating element 8 is arranged outside the case 2, therefore outside the circulation volume of the fluid delimited by the case 2, on the other side of the seal between the capsule 60 and the case 2, but also outside the capsule 60, so that the heating element 8 is not immersed in the heat-expandable material. It will be noted that the heating element 8 is preferably arranged in contact with the capsule 60, and more precisely against its outer portion 63b. According to a preferred embodiment, the heating element 8 is positioned against the bottom 62 of the capsule 60. The thermostatic valve 1 can comprise a thermally and/or electrically conductive paste, of the paste type charged with silver particles, at the interface between the heating element 8 and the outer portion 63b of the capsule 60, in order to guarantee good thermal and/or electrical continuity. This thermal conductive paste can be silicone or grease based paste, charged with metal oxides (for example oxides of zinc, aluminum, etc.), and possibly charged with powder or nanoparticles of silver or carbon so that it is electrically conductive. This paste may or may not be adhesive. This paste makes it possible to fill even microscopic irregularities between the two surfaces in contact, the conductive paste expelling the air who is a very bad conductor. It is alternatively possible to use a thermally and/or electrically conductive self-adhesive patch. Furthermore, the heating element 8 may comprise a thermally and/or electrically conductive coating.

Figure 2A:
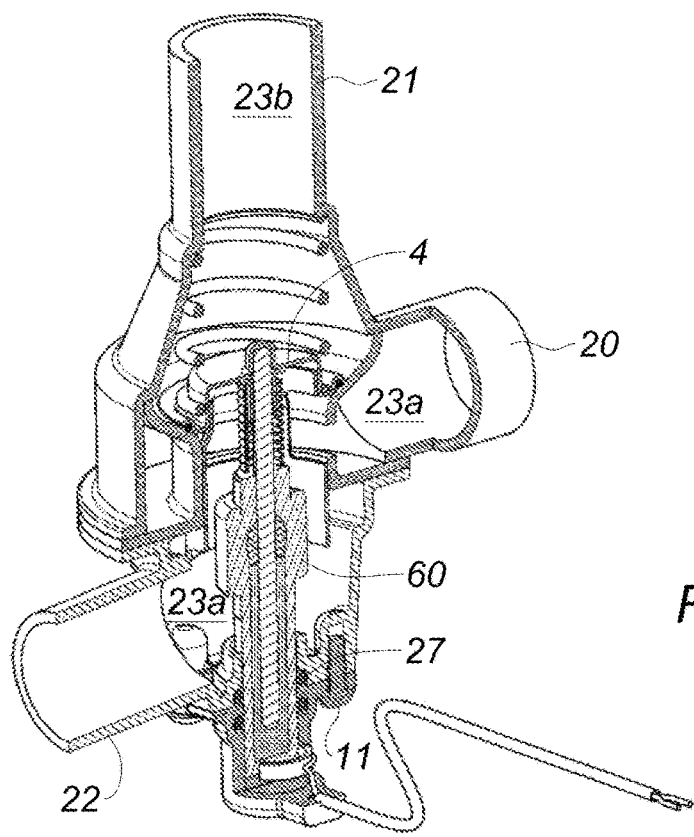
FIG. 2A is a sectional and perspective view of a valve according to one embodiment of the disclosure.
Figure 2B:
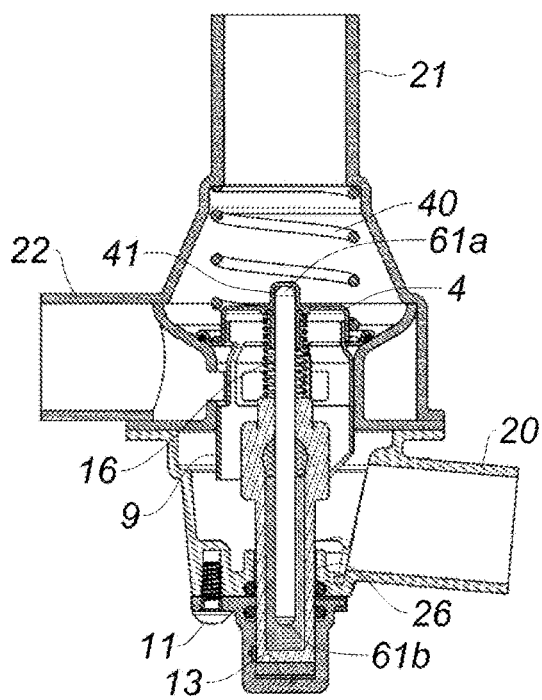
FIGS. 2B and 2C are sectional views of a valve according to one embodiment of the disclosure, the main flap respectively in the closed and open position.
Figure 2C:
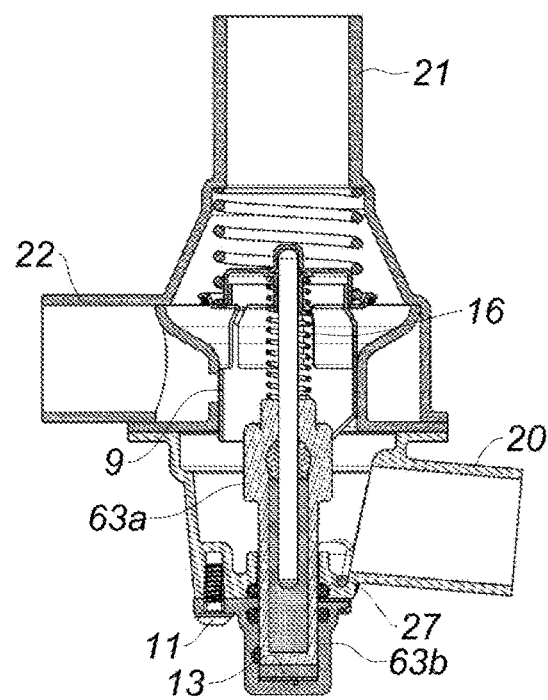
Figure 2D:
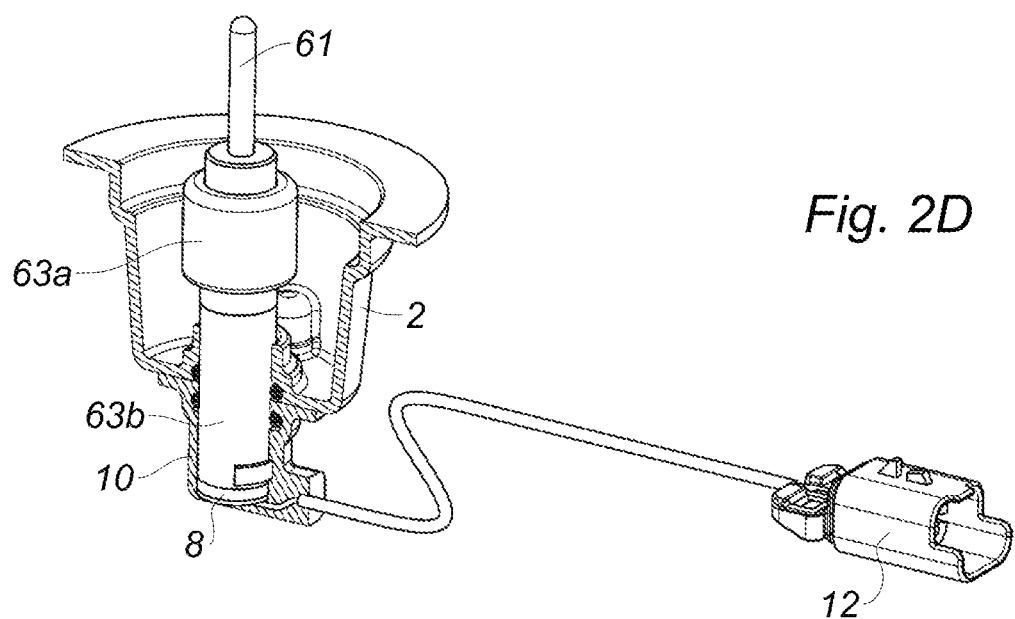
FIG. 2D is a sectional and perspective view of valve portion according to one embodiment of the disclosure.
Figure 2E:
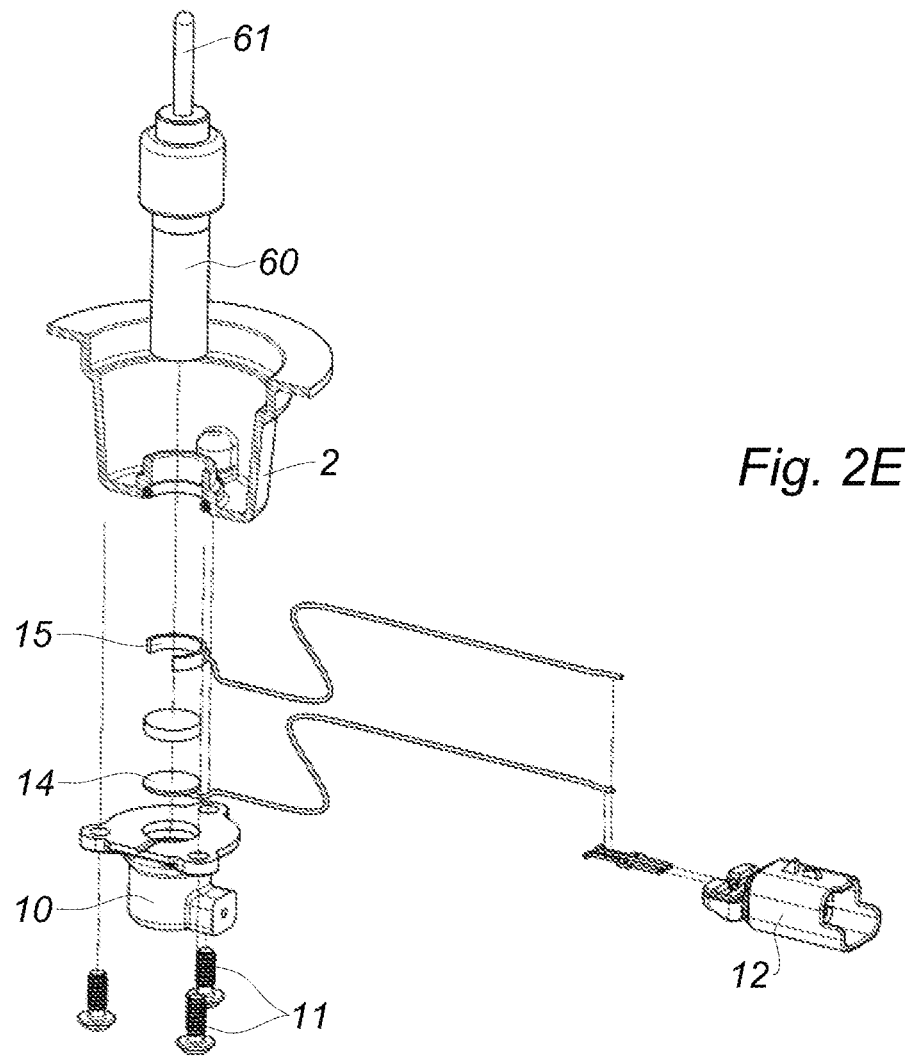
FIG. 2E is an exploded and sectional view of the valve portion illustrated in FIG. 2D.

To protect the heating element 8 as well as the outer portion 63b of the capsule 60, there is provided a protective cap 10 which is advantageously attached to the case 2. This protective cap 10 delimits for example a case at the bottom of which is housed the heating element 8 and can also receive the outer portion 63b. Preferably, in accordance with the embodiment illustrated in FIGS. 3A to 3E, the protective cap 10 is welded to the case, thereby improving the seal. Alternatively or in a complementary manner, the protective cap 10 can be fixed to the case 2 by means of fasteners such as screws 11, as illustrated in FIGS. 2B, 2C and 2E, which makes it possible to effectively press the heating element 8 against the capsule 60 in order to guarantee electrically and/or thermally reliable continuity between the heating element 8 and the capsule 60. In all cases, the protective cap 10 advantageously comprises a bearing wall 13 intended to bear against the heating element 8 in order to press the latter against the capsule 60.

The thermostatic valve 1 also comprises an electrical connector 12 for connecting the heating element 8 to a power supply. The electrical connector 12 can be remote from the protective cap 10 (FIGS. 2A to 2E) or integrated into the protective cap 10, for example molded therewith (FIG. 3A to 3E). The protective cap 10 comprises the electrical contacts; it is configured to allow the passage of the pilot wires from the heating element 8 to the connector 12.

In order to optimize the heat transfer from the heating element 8 to the wax capsule 60, it is advantageous to bring the heating element 8 into direct contact with the bottom of the capsule 60. In this case, as illustrated in the FIGS. 2A, 2D and 2E, a first electrode 14 can be placed at the bottom of the protective cap 10, for example against its bearing wall 13 or possibly welded to the PTC tablet, then on the capsule side 60, by the capsule 60 itself connected to the ground by a second electrode 15 interposed between the capsule 60 and the heating element 8, optionally clipped, or welded to the heating element 8. In order to ensure good continuity between the heating element 8 and the capsule 60, it is advantageous to use a paste with thermal and electrical conductivity such as a paste described above, charged for example with silver particles.

Figure 3A:
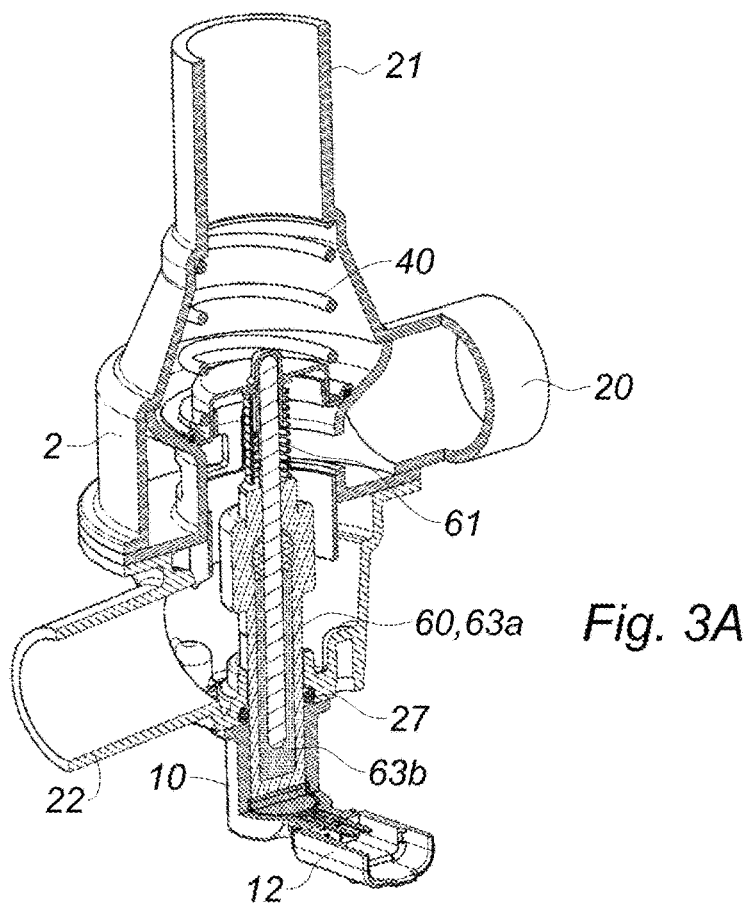
FIG. 3A is a sectional and perspective view of a valve according to one embodiment of the disclosure.
Figure 3B:
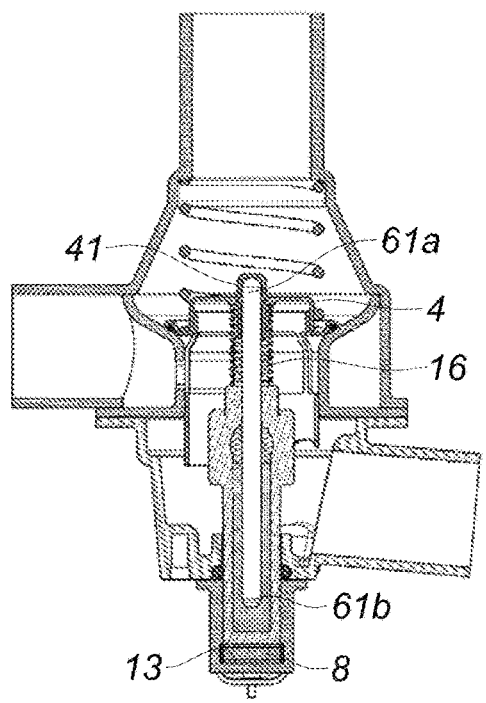
FIGS. 3B and 3C are sectional views of a valve according to an embodiment of the disclosure, main flap respectively in the closed and open position.
Figure 3C:
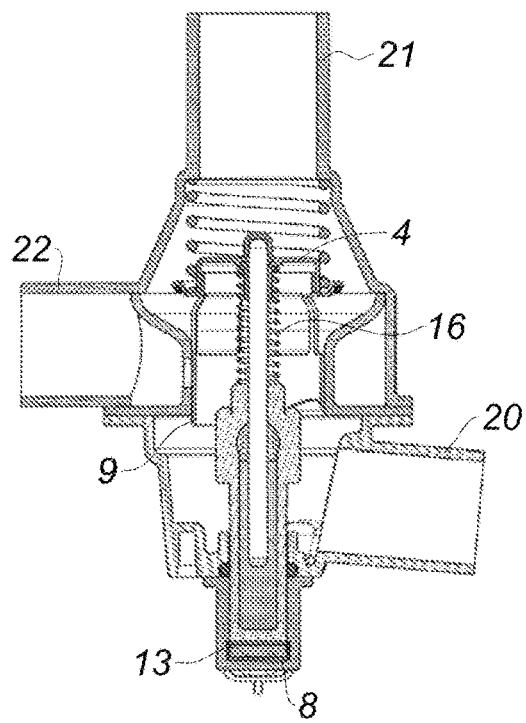
Figure 3D:
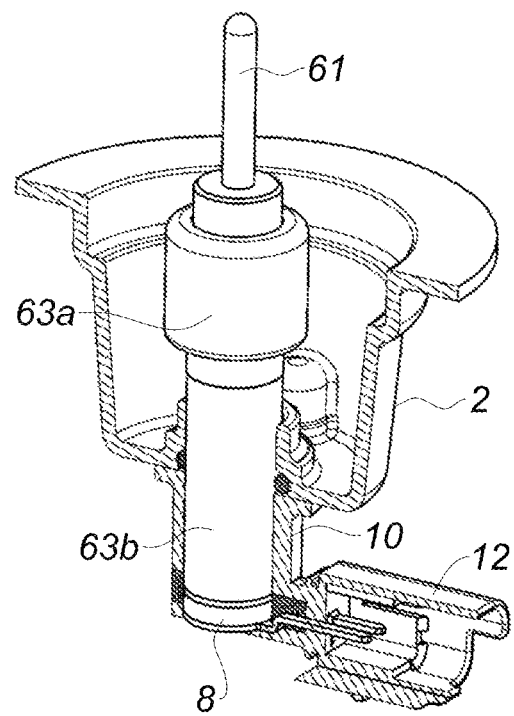
FIG. 3D is a sectional and perspective view of a valve portion according to one embodiment of the disclosure.
Figure 3E:
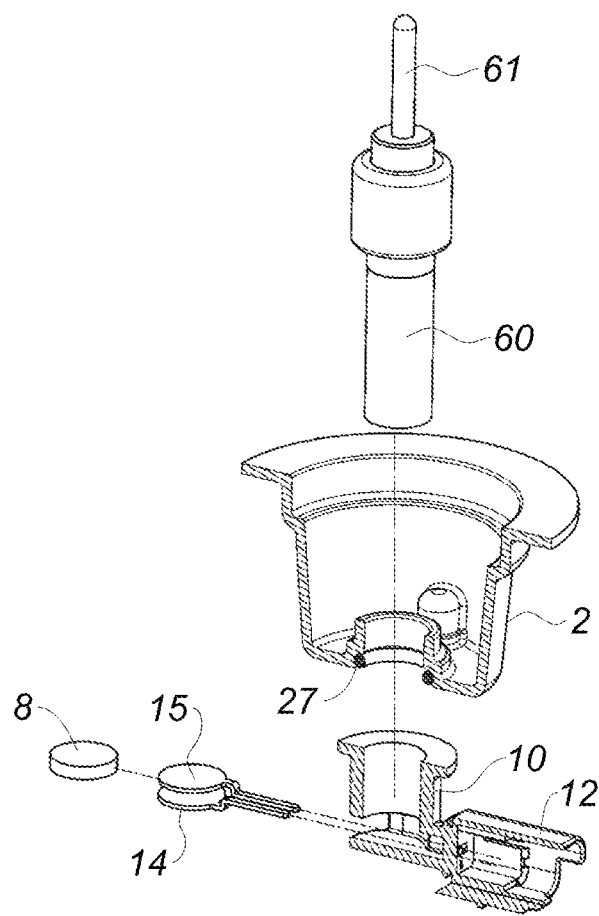
FIG. 3E is an exploded sectional view of the valve portion illustrated in FIG. 3D.

The two electrodes 14, 15, for example made of brass, are connected to the pilot wires. Alternatively, as illustrated in FIGS. 3A, 3D and 3E, the two electrodes 14, 15 can be placed, for example welded, on either side of the PTC tablet. This stacking of the two electrodes 14, 15 on the PTC tablet allows the use of a thermally conductive but electrically insulating paste between the capsule 60 and the heating element 8.

It will be noted in FIGS. 2A-2C and 3A-3C that the thermostatic valve 1 advantageously comprises return means configured to hold the heating element 8 in contact with the capsule 60. These return means, for example a spring 16 make it possible to hold the stacking capsule 60 and heating element 8 under pressure when the main flap 4 is closed, in order to guarantee good thermal and electrical continuity. The spring 16 bears here on an upstream face of the main flap 4 on the one hand, and on the submerged end 60a of the capsule 60 on the other hand. It extends around the actuating rod 61.

Furthermore, the thermostatic valve 1 may comprise a secondary flap 9 configured to close or open the second fluid outlet 22 when the main flap 4 is respectively open or closed. This secondary flap 9 may be formed by a slide, for example cylindrical, provided with a fluid passage window and connected to the main flap 4 so that the opening, respectively the closing, of the latter causes the closing, respectively the concomitant opening of the secondary flap 9, that is to say the positioning of the fluid passage window of the slide forming the secondary flap 9 offset, respectively opposite, an opening of the second outlet 22. Thus, the two flaps 4, 9 are secured in translation. The secondary flap 9 extends parallel to the thermostatic actuator 6, the tubular slide forming the secondary valve 9 extending in particular around the thermostatic actuator 6.

The operation of the thermostatic valve 1 is described below.

In a non-controlled operating mode, the wax capsule 60, via its submerged inner portion 63a, follows the evolution of the temperature of the fluid which circulates in the case 2. The rise in the temperature of the fluid up to a predetermined threshold causes a change of state of the wax which passes from a solid state to a liquid state. This change of state is accompanied by a significant increase of the volume of wax which pushes back the actuating rod 61 and, in doing so, opens the main flap 4. The opening of the main flap 4 is accompanied by a gradual closing of the secondary bypass flap 9 in order to concentrate the flow to the radiator. When subsequently the temperature of the fluid while cooling reaches a predetermined temperature threshold (corresponding to the opening temperature threshold shifted by a hysteresis), the wax changes the state again, passing from liquid to solid state, with a significant reduction in volume. Under the pressure of the spring 40, the main flap 4 is closed, and the secondary flap 9 opens to allow the return of the fluid to a circulation pump.

In controlled operating mode, the heating element 8 is powered and heats the outer portion 63b emerging from the capsule 60. Firstly, only the volume of wax near the heating element 8 is concerned; nonetheless, the solid wax being a poor thermal conductor, this small volume quickly changes the state, causing the main flap 4 to start opening. Depending on the temperature of the fluid circulating in the case 2 and the electrical power of the heating element 8, the inner temperature of the capsule 60 will equilibrate with all or part of the solid or liquid wax, thus regulating the stroke of opening of the main flap 4, making it possible to anticipate the opening of the main flap 4, that is to say to lower the opening temperature, in conditions of high engine stress.

When stopping the electric drive, the heat released by the heating element 8 diffuses towards the submerged portion 63a of the wax capsule 60, and towards the liquid circulating in the case, thus ensuring cooling of the wax and a reduction in volume linked to the change of state from liquid to solid, thus allowing the closing of the flap 4 thanks to the thrust of the closing spring 40.

Of course, the disclosure is in no way limited to the embodiment described above, this embodiment having been given only by way of example. Modifications are possible, in particular from the point of view of the constitution of the various devices or by the substitution of technical equivalents, without thereby departing from the scope of protection of the disclosure.

Thus, the case 2 could include several inlets 20 and/or outlets 22 for fluid.

The invention claimed is:

1. A thermostatic valve comprising: a case, the case comprising at least one fluid inlet, at least one first fluid outlet and at least one second fluid outlet, a main flap movable relative to the case between a closed position in which the main flap closes the first fluid outlet and an open position in which the main flap opens the first fluid outlet, a thermostatic actuator, the thermostatic actuator comprising an actuating rod connected to the main flap and a capsule fixedly mounted with respect to the case and extending through a mounting opening of the case containing a heat-expandable material, and a heating element for heating the heat-expandable material, wherein the capsule of the thermostatic actuator has an inner portion which extends inside the case and is configured to bathe in fluid circulating between the inlet and the second outlet of the case, and an outer portion which extends outside the case a length of the inner portion being in a range of approximately two thirds to three quarters of a total length of the capsule, in that the heating element is arranged outside the case and out of the capsule to heat the outer portion of this capsule, the inner portion of the capsule and the outer portion of the capsule being formed of a single unitary structure.

2. The valve according to claim 1, wherein the heating element is a PTC element.

3. The valve according to claim 1, wherein the thermostatic valve comprises a thermally and electrically insulating protective cap, housing the heating element and the outer portion of the capsule.

4. The valve according to claim 1, wherein the thermostatic valve comprises return means configured to maintain the heating element in contact with the capsule.

5. The valve according to claim 1, wherein the heat-expandable material is a wax including a thermally conductive charge.

6. The valve according to claim 1, wherein the capsule is fixedly mounted relative to the case.

7. The valve according to claim 1, wherein the actuating rod is configured to extend into the outer portion of the capsule.

8. The valve according to claim 1, wherein the thermostatic valve comprises return means of the main flap in the closed position, mounted in opposition to the thermostatic actuator.

9. The valve according to claim 1, wherein the thermostatic valve comprises a secondary flap configured to close or open the second fluid outlet when the main flap is respectively open or closed.

10. A motor vehicle comprising a thermostatic valve according to claim 1.

* * * * *